US006362263B1

(12) United States Patent
Brown et al.

(10) Patent No.: US 6,362,263 B1
(45) Date of Patent: Mar. 26, 2002

(54) POLY(PHENYLENE ETHER)-POLYAMIDE RESIN BLENDS, METHOD, AND ARTICLES MADE THEREFROM

(75) Inventors: Sterling Bruce Brown, Niskayuna; Norberto Silvi, Clifton Park; Mark Howard Giammattei, Selkirk; Navjot Singh; Farid Fouad Khouri, both of Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,615

(22) Filed: Dec. 7, 1999

(51) Int. Cl.[7] ............................ C08K 5/54; C08L 77/06; C08L 71/12

(52) U.S. Cl. ...................... 524/267; 524/268; 524/500; 524/538; 524/540; 525/393; 525/397; 525/401; 525/426; 525/431

(58) Field of Search ................................. 525/431, 393, 525/426, 401, 397; 524/267, 268, 500, 540, 538

(56) References Cited

U.S. PATENT DOCUMENTS

| 3,824,208 A | | 7/1974 | Link et al. |
|---|---|---|---|
| 4,315,086 A | | 2/1982 | Ueno et al. |
| 4,659,760 A | | 4/1987 | Van der Meer |
| 4,732,938 A | | 3/1988 | Grant et al. |
| 5,153,238 A | | 10/1992 | Bilgrien et al. |
| 5,391,594 A | | 2/1995 | Romenesko et al. |
| 5,412,014 A | | 5/1995 | Romenesko |
| 5,478,878 A | * | 12/1995 | Nagaoka et al. |
| 5,484,858 A | | 1/1996 | Smits et al. |
| 5,506,305 A | * | 4/1996 | Nagaoka et al. |
| 5,508,323 A | | 4/1996 | Romenesko et al. |
| 5,610,223 A | | 3/1997 | Mason |
| 5,714,550 A | | 2/1998 | Shaw |

FOREIGN PATENT DOCUMENTS

| EP | 0 236593 | 9/1987 |
|---|---|---|
| EP | 0 369169 | 5/1990 |
| EP | 0 943659 | 9/1999 |
| FR | 2 640 632 | 12/1988 |

OTHER PUBLICATIONS

International Search Report for PCT application PCT/US 00/31289.

Buch, R.; Romenesko, D., Silicone Based Additives for Thermoplastic Resins Providing Improved Fire Properties Such as Reduced Heat Release Rate, Reduced Toxic Gasses and Smoke as Measured By the Cone Calorimeter, Pap. Fire Retard. Chem. Assoc. Fall Conf., 1993, 1–15 (Eng).

* cited by examiner

Primary Examiner—Robert Dawson
Assistant Examiner—Marc S. Zimmer
(74) Attorney, Agent, or Firm—S. Bruce Brown; Noreen C. Johnson

(57) ABSTRACT

Impact modified, compatibilized poly(phenylene ether)-polyamide compositions containing either a polybutene or an organosiloxane mixture give molded parts with good surface appearance, improved flow at high shear rate, and improved low temperature impact strength in comparison to control blends without added organosiloxane mixture or polybutene.

16 Claims, No Drawings

POLY(PHENYLENE ETHER)-POLYAMIDE RESIN BLENDS, METHOD, AND ARTICLES MADE THEREFROM

BACKGROUND OF THE INVENTION

The invention relates to compositions of impact modified, compatibilized poly(phenylene ether)-polyamide resin blends containing either a polybutene or an organosiloxane mixture. The invention also relates to methods to prepare said compositions and articles formed from the compositions.

Poly(phenylene ether)-polyamide blends may possess properties which are a combination of the beneficial properties of both resins. These include high thermal stability afforded by poly(phenylene ether)s and solvent resistance afforded by polyamides.

For the preparation of blends other than those containing a minimum proportion of one resin, the presence of a compatibilizing agent is necessary since the two polymers are otherwise incompatible. Examples of compatibilized poly(phenylene ether)-polyamide blends can be found in U.S. Pat. No. 4,315,086 (Ueno, et al.); U.S. Pat. No. 4,659,760 (van der Meer); and U.S. Pat. No. 4,732,938 (Grant, et al.). In the absence of compatibilization, morphological examination of poly(phenylene ether)-polyamide blends typically shows a continuous polyamide phase with poly(phenylene ether) forming a second phase poorly dispersed therein, often resulting on a macroscopic scale in the formation of laminar structures with poor physical properties.

At least one impact modifier is usually also present in typical poly(phenylene ether)-polyamide compositions. Suitable impact modifiers include those compatible with polyamides and especially those compatible with poly(phenylene ether)s. The properties of these blends can be further enhanced by the addition of various additives such as light stabilizers, flame retardants, heat stabilizers, antioxidants and fillers.

The physical properties of poly(phenylene ether)-polyamide blends make them attractive for a variety of end-use articles in the automotive market, especially for under-hood and various exterior components. Additional applications in other markets have been somewhat limited by the lack of low temperature impact strength in these blends. The blends must also have outstanding ductility, flow and surface appearance. It is therefore apparent that a need continues to exist for poly(phenylene ether)-polyamide compositions with improved low temperature impact strength in combination with other attractive physical properties.

Poly(diorganosiloxane)s or polybutenes might provide low temperature impact strength due to their low Tg (for example about −129° C. for poly(dimethylsiloxane) and less than about −60° C. for a typical polybutene). In addition, poly(diorganosiloxane)s may also provide superior weatherability, high flow and improved flame retardance as compared to other additives such as butadiene-based rubbers. However, poly(diorganosiloxane)s are immiscible with most thermoplastics. In order to obtain optimum blend physical properties poly(diorganosiloxane)s typically require compatibilization when they are included as blend components. Conventional routes to using poly(diorganosiloxane)s involve their addition to blends in the form of copolymers like block copolymers, core-shell copolymers or graft copolymers with other thermoplastics that are compatible with one or more other polymers in the blend. The copolymer approach also helps in controlling the particle size of the poly(diorganosiloxane)-containing phase which may be critical for tailoring the impact performance of the blend. While these approaches are viable, the added cost of preparing block, core-shell, or graft copolymers from poly(diorganosiloxane)s makes them unpractical.

The use of poly(diorganosiloxane)-containing powders without pre-forming copolymers and without added compatibilizing agent has been reported for improving the flame resistance of thermoplastics. The powders may be prepared by dispersing high molecular weight silicone gums with a filler using methods taught in, for example, U.S. Pat. Nos. 3,824,208 and 5,153,238, which claim that the powders have storage stability and are gel free. U.S. Pat. No. 5,153,238 recommends preparing the powder by mixing in a high intensity mixer at temperatures varying from 100° C. to 200° C. U.S. Pat. Nos. 5,391,594 and 5,508,323 are directed to methods for using poly(diorganosiloxane)-containing powders for improving the burn character of thermoplastic resins, such as poly(phenylene ether) or polyamide, that results in improvements in the rate of smoke release, generation of smoke and evolution of toxic carbon monoxide. U.S. Pat. No. 5,412,014 is directed to the use of a phosphorus flame retardant as a synergist in conjunction with poly(diorganosiloxane)-containing powders for improving the flame retardance of thermoplastic resins. Further, Buch, et al. ("Silicone-Based Additives for Thermoplastic Resins Providing Improved Fire Properties Such as Reduced Heat Release Rate, Reduced Toxic Gases and Smoke as Measured by the Cone Calorimeter", Dow Coming Corp., Fire Retardant Chem. Assoc., Oct. 26–29, 1993, pp. 1–15) report the use of poly(diorganosiloxane)-containing resin modifier products termed RM 4-7081 and RM 4-7051 for improving the flame retardance of organic resins. That paper also discloses the improvements in impact performance of engineering resins such as poly(phenylene ether) in the absence of other added impact modifiers.

The use of powders prepared from poly(diorganosiloxane)-containing gums containing epoxy and carboxyl functionalities for improving the impact performance of polyamide resins is the subject of U.S. Pat. No. 5,610,223. The polyamide-based blends rely on the reactive epoxy or ester functionalities on the gums to effect a compatibilization reaction with amino or acid end-groups on the polyamide resins. This type of approach depends on the commercial availability of pre-functionalized poly(diorganosiloxane) gums and is limited by the functionality concentrations available on these gums. Moreover, the copolymer-forming compatibilizing reaction between the thermoplastic resin and the functionalized gum may be limited by the mobility of the siloxane chain as the molecular weight of the poly(diorganosiloxane)-containing gum increases.

French patent application FR 2,640,632, assigned to Rhône-Poulenc Chimie, is directed to a method for compatibilizing a poly(diorganosiloxane) with polyester or polyamide said to have improved impact resistance and surface qualities. The thermoplastic resin is blended with a non-reactive poly(diorganosiloxane) gum and a mono- or bi-functional poly(diorganosiloxane) oil. The poly(diorganosiloxane) gum is described as being a high viscosity linear polymer with a molecular weight greater than 300,000 g/mol. In a preferred embodiment, the gum contains 100–1000 ppm vinyl groups. The functionalized poly(diorganosiloxane) oil reacts with polyamide or polyester end-groups to provide a copolymer compatibilizing agent.

U.S. patent application Ser. No. 09/293,915, filed Apr. 19, 1999 now abandoned discloses a method for improving the physical properties of thermoplastic molding compositions. A polyester and/or polyamide is blended with a poly (diorganosiloxane)-containing impact modifier and an epoxy- or orthoester-functionalized compound. The epoxy- or orthoester-functionalized compound is the compatibilizing agent for the polyester and/or polyamide blend and impact modifier. The impact modifier may contain at least one of several silicone-containing components such as a poly(diorganosiloxane) compound, an inorganic filler, and optionally, a silicone additive. The silicone-containing component combined with the compatibilizing agent yields a blend product with high impact strength.

The compounds of the patents described above all provide to some degree a polymer blend composition with certain properties improved, but there still remains a need for compatibilized poly(phenylene ether)-polyamide blends which can be molded to form high-quality parts which display excellent impact strength, and specifically, exceptional notched Izod impact strength at low temperature, while retaining other key physical properties such as flow and good surface appearance. In particular, in the case of poly(diorganosiloxane)-containing compositions, there still remains a need for a poly(phenylene ether)-polyamide blend which does not rely on poly(diorganosiloxane) alone as the impact modifier and in which the poly(diorganosiloxane)-containing species is not compatibilized using a functionalized compound.

BRIEF SUMMARY OF THE INVENTION

The present invention is based on the discovery that various physical properties, including low temperature impact strength, of compatibilized poly(phenylene ether)-polyamide blends are improved by the addition of a polybutene or an organosiloxane mixture. More particularly, the present inventors have unexpectedly discovered that the addition of a polybutene or an organosiloxane mixture improves the impact strength of said blends when they already contain at least one impact modifier. Furthermore, said compositions do not require addition of a functionalized compatibilizing agent to compatibilize the organosiloxane mixture in the blend.

Accordingly, the invention includes resinous compositions, said compositions comprising the following and any reaction products thereof:

(A) a continuous phase comprising at least one polyamide;

(B) at least one poly(phenylene ether) resin;

(C) at least one impact modifying polymer;

(D) a non-polymeric functionalizing compound containing at least two functional groups capable of reacting with poly(phenylene ether)s and polyamides; and, a minor proportion, effective to improve physical properties or surface appearance of the composition, of either (E) at least one polybutene or (F) an organosiloxane mixture comprising,
(i) 100 parts by weight of at least one poly (diorganosiloxane) compound;
(ii) from 0 to about 100 parts by weight of at least one inorganic filler; and
(iii) from 0 to about 20 parts by weight of at least one silicone additive.

The present invention also provides articles made from the resin compositions in addition to methods to make said polybutene-containing and poly(diorganosiloxane)-containing compatibilized poly(phenylene ether)-polyamide resin compositions.

DETAILED DESCRIPTION OF THE INVENTION

The invention is inclusive of simple blends of the above-designated materials and also of compositions in which two or more of said materials have undergone chemical reaction. When proportions are specified, they apply to the originally incorporated materials rather than those remaining after any such reaction.

Polyamides suitable for use as reagent A, the continuous phase, may be made by any known method. Suitable polyamides include those of the type prepared by the polymerization of a monoamino-monocarboxylic acid or a lactam thereof having at least 2 carbon atoms between the amino and carboxylic acid group; of substantially equimolar proportions of a diamine which contains at least 2 carbon atoms between the amino groups and a dicarboxylic acid; or of a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned 6-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

Suitable dicarboxylic acids include those which contain an aliphatic or aromatic group containing at least 2 carbon atoms separating the carboxy groups. The aliphatic acids are often preferred; they include sebacic acid, octadecanedioic acid, suberic acid, glutaric acid, pimelic acid and adipic acid.

For most purposes, the preferred polyamides by reason of their availability and particular suitability are poly (hexamethylene adipamide), hereinafter designated "polyamide-66", and poly(caprolactam), hereinafter designated "polyamide-6". Polyamides having an amine end group concentration of at least about 20 microequivalents per gram are often preferred, by reason of their suitability for compatibilization via copolymer formation with the poly (phenylene ether). Mixtures of polyamides are also suitable for use in the compositions of the invention. In particular mixtures of polyamides with different amine end group concentrations are suitable, such as mixtures of two polyamide-6 grades or mixtures of two polyamide-66 grades or mixtures of polyamide-6 and polyamide-66 with different amine end-group concentrations. Moreover, the amine to acid end-group ratio of the polyamide resin may also be varied as well as the relative viscosity of the polyamide contained within the resin composition. In many instances, polyamides or mixtures of polyamides in which the amine end group concentration is at least about 60 microequivalents per gram are particularly useful. It is also within the scope of the invention, however, to employ predominantly carboxylic acid-terminated polyamides.

The poly(phenylene ether)s employed as component B according to the present invention are known polymers comprising a plurality of structural units of the formula

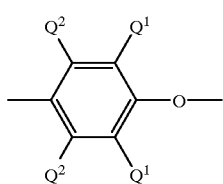

(I)

wherein in each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer poly(phenylene ether)s are included. The preferred homopolymers are those containing 2,6-dimethyl-1,4-phenylene ether units. Suitable copolymers include random copolymers containing such units in combination with (for example) 2,3,6-trimethyl-1, 4-phenylene ether units. Also included are poly(phenylene ether)s containing moieties prepared by grafting onto the poly(phenylene ether) in known manner such materials as vinyl monomers or polymers such as polystyrenes and elastomers, as well as coupled poly(phenylene ether)s in which coupling agents such as low molecular weight polycarbonates, quinones, heterocycles and formals undergo reaction in known manner with the hydroxy groups of two poly(phenylene ether) chains to produce a higher molecular weight polymer.

The poly(phenylene ether) has an intrinsic viscosity (IV) greater than about 0.09, preferably greater than about 0.25, more preferably in the range of about 0.25–0.6 and most preferably in the range of 0.4–0.6 dl./g., as measured in chloroform at 25° C. Mixtures of poly(phenylene ether)s with different intrinsic viscosities are also suitable for use in the compositions of the invention. Such mixtures include those containing both low and high intrinsic viscosity poly (phenylene ether) resins such as 0.12 IV resin in combination with 0.46 IV resin.

The poly(phenylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(phenylene ether)s for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the poly(phenylene ether)s contemplated for use in the present invention include all those presently known, irrespective of variations in structural units or ancillary chemical features.

Component C, the at least one impact modifying polymer, may be any polymer known to improve the impact strength of poly(phenylene ether)-polyamide blends. Examples of suitable polymers are high impact polystyrene; polydienes such as polyisoprene and polybutadiene; styrene-diene block copolymers including diblock and triblock copolymers, in which the diene structural units may be partially or entirely hydrogenated; olefin polymers containing carboxylic acid or ester groups and core-shell polymers having rubbery cores and stiff shells with carboxylic acid groups or functional derivatives thereof (e.g., anhydride, ester, amide or imide groups).

Useful elastomers for this purpose are known in the art and include, for example, styrenic block copolymers and various acid functionalized ethylene-propylene copolymers (e.g., EP-graft-maleic anhydride). Especially preferred are the so called elastomeric block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially or totally hydrogenated. Mixtures of these triblock copolymers and diblock copolymers are especially preferred in the present compositions.

Suitable A-B and A-B-A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A-B and A-B-A block copolymers include polystyrene-polybutadiene (SBR), hydrogenated polystyrene-polybutadiene (also sometimes known as polystyrene-poly(ethylene-propylene)), polystyrene-polyisoprene, poly(α-methylstyrene)-polybutadiene, polystyrene-polybutadiene-polystyrene (SBS), hydrogenated polystyrene-polybutadiene-polystyrene (also sometimes known as polystyrene-poly(ethylene-butylene)-polystyrene (SEBS)), polystyrene-polyisoprene-polystyrene and poly (α-methylstyrene)-polybutadiene-poly(α-methylstyrene), as well as the selectively hydrogenated versions thereof. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON.

Also useful elastomers include functionalized elastomeric polyolefins such as elastomeric polyolefins containing at least one moiety of the group consisting of anhydride, epoxy, oxazoline, and orthoester. The essential structural units of the elastomeric polyolefin are typically derived from ethylene and at least one $C_{3-8}$-alpha-olefin, such as propylene, 1-butene, 1-hexene, and 1-octene. The proportions of ethylene and at least one $C_{3-8}$ alpha-olefin are not critical provided that they together constitute the major portion of the polymer.

In a preferred embodiment, the functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers, respectively. Mixtures of impact modifiers, such as mixtures of those previously described are also useful.

The non-polymeric functionalizing compound or compatibilizing agent (component D) may be any known non-polymeric compound having functional groups capable of reacting with poly(phenylene ether)s and/or polyamides, thereby permitting formation of copolymeric molecules. Such functional groups include carboxylic acid, anhydride, amide, ester, ortho ester, epoxide, olefin, halotriazine, phosphate, hydroxy and amino groups. Preferably, component D contains at least one group capable of reacting with each of reagents A and B. Illustrative functionalizing compounds include maleic anhydride, fumaric acid, citric acid, trimellitic anhydride acid chloride, glycidyl methacrylate, mesityl glycidyl chlorocyanurate, 4-acryloyloxymethyl-2-methoxy-2-methyl-1,3-dioxolane, 2-chloro-4-(2-methoxy-2-methyl-1,3-dioxolanylmethoxy)-6-phenoxy-1,3,5-triazine and 2-chloro-4-(2-diethylphosphatoethoxy)-6-mesitoxy-1,3,5-triazine. Preferred compatibilizing agents include one or more of citric acid, fumaric acid, malic acid, maleic acid, maleic anhydride, itaconic acid, itaconic anhydride, citraconic acid, citraconic anhydride, as well as various derivatives of the foregoing and similar compounds. Particularly preferred compatibilizing agents comprise anhydrous citric acid, citric acid hydrate, or aqueous citric acid.

The chemical nature of the functionalizing compound will determine, to some extent, how it is incorporated in the composition. For example, such functionalizing compounds as acid chlorides react rapidly with poly(phenylene ether)s and are normally blended first with the poly(phenylene ether) in solution, after which the resulting reaction product is blended with the other constituents. On the other hand, compounds such as maleic anhydride, fumaric acid and citric acid may conveniently be blended simultaneously in the melt with the poly(phenylene ether) and, optionally one or more of the other constituents, whereupon the functionalizing reactions take place.

Although the invention is not dependent on mechanism of action, it is believed that component D serves as a compatibilizing agent for poly(phenylene ether)-polyamide and does not serve to compatibilize polybutene (component E) or organosiloxane mixture (component F) with the poly(phenylene ether) or polyamide. In one embodiment the present invention is based on the discovery that no separate compatibilizing agent need be added to achieve improvement in physical properties (such as low temperature impact strength) of impact modified poly(phenylene ether)-polyamide blends through addition of a minor proportion of an organosiloxane mixture or a polybutene.

The proportions of components A, B and C in the compositions of this invention are not critical, so long as the polyamide comprises the continuous phase and poly(phenylene ether) comprises the dispersed phase. In general, the proportion of poly(phenylene ether) (component A) will be about 20–60% and preferably about 25–45% by weight of the total composition. Increasing the level of the polyamide (component B) above 40% by weight typically results in enhanced ductility and flow and is often preferred. The proportion of the at least one impact modifier (component C) is typically about 1–20%, preferably about 1–15%, and more preferably about 1–10% by weight of the total composition. In preferred embodiments of the invention the impact modifier resides essentially in and/or around the poly(phenylene ether) dispersed phase. The compatibilizing agent (component D) will be present typically in the amount of about 0.1–2.0 parts per 100 parts of the combination of components A, B and C.

Component E, the at least one polybutene, when present, is typically a polymer prepared by polymerization of isobutylene or an isobutylene-rich olefin stream containing butene isomers, such as 1-butene and/or 2-butene. The major component of the polybutene is typically that shown in formula II:

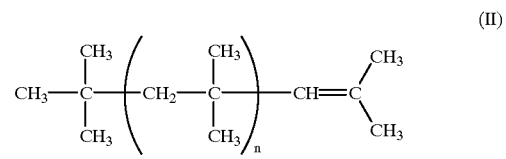

Non-hydrogenated polybutenes are preferred. Thus, suitable polybutenes comprise end-group unsaturation and also any internal double-bonds that may arise during the polymerization process. Suitable polybutenes have number average molecular weight (as determined by gel permeation chromatography) between about 250 and about 3000, preferably between about 350 and about 2300. In especially preferred embodiments suitable polybutenes have number average molecular weight between about 350 and about 500. Suitable polybutenes may have kinematic viscosities (as determined by ASTM D445) between about 20 and about 300 centistokes at 38° C., and preferably between about 100 and about 150 centistokes at 38° C. Suitable polybutenes may also have kinematic viscosities (as determined by ASTM D445) between about 20 and about 5000 centistokes at 99° C., and preferably between about 25 and about 250 centistokes at 99° C. In especially preferred embodiments suitable polybutenes have kinematic viscosities (as determined by ASTM D445) between about 110 and about 130 centistokes at 38° C.

Suitable polybutenes may contain functionality such as epoxide or anhydride. When functionality is present, then all or at least a portion of double bonds in polybutene may have been consumed in the functionalization process. Preferred polybutenes have neutralization numbers of less than about 0.03 and preferably less than or about equal to 0.02 milligrams potassium hydroxide per gram polymer (as determined by ASTM D974).

Component F, the organosiloxane mixture, when present, includes (i) at least one poly(diorganosiloxane) compound; optionally (ii) at least one inorganic filler; and optionally (iii) at least one silicone additive. Poly(diorganosiloxane)s usually consist of a main chain of alternating silicon atoms and oxygen atoms, substituted with various organic groups at the silicon atom. The poly(diorganosiloxane)s may have different structures: homopolymer, block copolymer or random copolymer. Preferred poly(diorganosiloxane)s have the following structure:

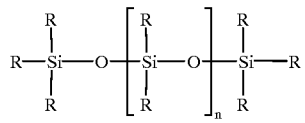

(III)

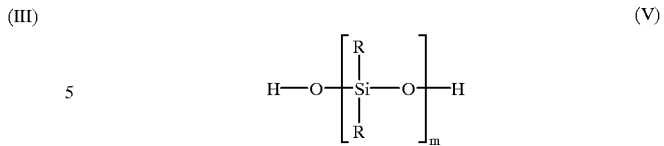

(V)

wherein each R independently represents hydrogen, $C_{1-15}$ alkyl, $C_{2-10}$ alkenyl, $C_{5-12}$ cycloalkyl, or aryl, which groups may be halogenated, particularly fluorinated, and wherein n is such that the compound has a nominal weight average molecular weight of from about 100,000 to about 1,500,000 grams/mole. A preferred poly(diorganosiloxane) is one derived from poly(dimethylsiloxane). In a more preferred embodiment, the poly(diorganosiloxane) has a nominal weight average molecular weight of about 800,000.

The poly(diorganosiloxane) compound is preferably present in the organosiloxane mixture in an amount of about 100 parts by weight. The poly(diorganosiloxane)s may be manufactured according to conventional methods and many are commercially available, e.g., from GE Silicones, Dow Corning, etc. Particularly preferred poly(diorganosiloxane)s include GE Silicones grade 88488-8 which is an 800 mm penetration poly(dimethylsiloxane) gum containing vinyl groups on the chain ends and the backbone. The general formula of 88488-8 gum is $M^{Vi}-D_xD^{Vi}_y-M^{Vi}$ and it contains about 0.25 mole % Vi groups. Also preferred is GE Silicones grade 81366-8 which is an 800 mm penetration poly (dimethylsiloxane) gum of the general formula MDxM.

The organosiloxane mixture may optionally contain an inorganic filler component. Suitable fillers include silica, alumina, titania, Wollastonite, calcium silicate, carbon black, calcium carbonate, clays, kaolin, aluminum silicate, bentonite, montmorillonite, talc, synthetic magnesium silicate, zeolites, zinc oxide, barium sulfate, calcium sulfate, wood flour, wood cellulose, or mixtures thereof. The fillers may be calcined and/or surface treated and/or intercalated with an organic additive as appropriate to improve the final properties of the filler-containing compositions. A particularly preferred filler component is a precipitated silica or a fumed silica, preferably a silane-treated fumed silica. Most preferably the filler component is a $D_4$ (octamethylcyclotetrasiloxane)-treated fumed silica. When present, said fumed silica is used in the organosiloxane mixture in an amount of from about 30 to about 100 parts by weight based on the weight of the poly(diorganosiloxane) compound, most preferably from about 60 to about 70 parts by weight.

The organosiloxane mixture also optionally contains one or more silicone additives. One class of suitable additives includes methoxy-stopped silicones having the following structure:

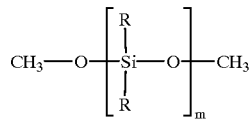

(IV)

wherein m is from about 4 to about 30, and each R independently represents hydrogen, $C_{1-15}$ alkyl, $C_{2-10}$ alkenyl, $C_{5-12}$ cycloalkyl, or aryl. In a preferred embodiment, m is about 9.

Another class of suitable additives are silanol-stopped silicones having the following structure:

wherein m is from about 4 to about 30, and each R independently represents hydrogen, $C_{1-15}$ alkyl, $C_{2-10}$ alkenyl, $C_{5-12}$ cycloalkyl, or aryl. In a preferred embodiment, m is about 7. Such compounds are commercially available from GE Silicones.

Another suitable silicone additive is a vinyl-functionalized alkoxysilane. Preferred vinyl-functionalized alkoxysilanes include commercially available vinyl triethoxysilane.

It is also possible to use as silicone additives functionalized poly(diorganosiloxane)s which comprise one or more groups (moieties) which are capable of reacting with a carboxyl group and/or an amine group on polyamide. Examples of such groups include amine groups, epoxy groups and groups derived from carboxylic acids. In this respect it is sometimes to be preferred to use at least one functionalized poly(diorganosiloxane) compound of formulas:

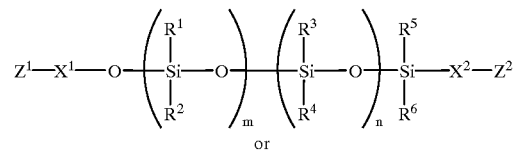

(VI)

or

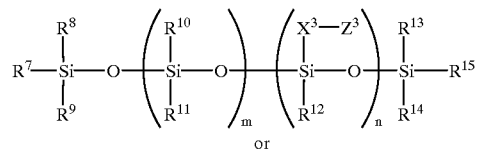

(VII)

or

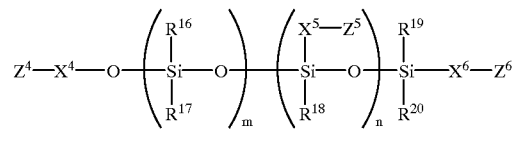

(VIII)

wherein m+n in each formula has a value of about 5 to about 2,000, and $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$, each independently of each other, represent a hydrogen atom or one of the following groups having 1 to 12 carbon atoms: alkyl, alkoxy, alkenyl, aryl, aralkyl, alkylaryl, which groups may be halogenated; wherein $X^1$, $X^2$, $X^3$, $X^4$, $X^5$, and $X^6$, each independently of each other, represent one of the following groups: alkylene, cycloalkylene, arylene, aralkylene, alkylarylene; wherein $Z^1$, $Z^2$, $Z^3$, $Z^4$, $Z^5$, and $Z^6$ each represent one of the following groups:

(a) $-NR^{21}R^{22}$ and $(-NH-(CH_2)_k-NR^{21}R^{22})$ in which $R^{21}$ and $R^{22}$, each independently of each other, represent a hydrogen atom or an alkyl group having 1–12 carbon atoms, k has a value from 1–10;

(b) an aliphatic or cycloaliphatic epoxide;

(c) a carboxylic acid group;
in which, however, the functionalized poly (diorganosiloxane) compound may not comprise simultaneously an amine group and an epoxide group, or not simultaneously an amine group and a carboxylic acid group, or not simultaneously an epoxide group and a carboxylic acid group. Suitable carboxylic acid groups include acid anhydride groups.

If a silicone additive is present, then any one or any combination of the foregoing preferred additives may be used. The silicone additive(s) may be present in an amount of from 0 to about 20 parts by weight based on poly (diorganosiloxane) compound. In a preferred embodiment, all three of the above-described additives are present, with the methoxy-stopped silicone and the silanol-stopped silicone each being present in an amount of about 2.5 parts by weight, and the vinyl triethoxysilane being present in an amount of about 0.8 parts by weight based on the weight of the poly(diorganosiloxane) compound.

The amount of polybutene (component E) or organosiloxane mixture (component F) present in the compositions is a minor proportion, effective to improve physical properties or surface appearance of the poly(phenylene ether)-polyamide blend. Within the present context a minor proportion means that the organosiloxane mixture or polybutene is present in the composition at a lower level by weight than the impact modifier, component C. Preferably, the organosiloxane mixture, when present, is present at a level of about 90%, more preferably about 60%, still more preferably about 30%, and most preferably about 15% by weight of the impact modifier, component C. In especially preferred embodiments the organosiloxane mixture, when present, is present in the blend at a level of about 1–30% by weight of the impact modifier, component C. Preferably, the at least one polybutene, when present, is present at a level of about 90%, more preferably about 60%, still more preferably about 30% by weight of the impact modifier, component C. In especially preferred embodiments the organosiloxane mixture or polybutene is present in the blend at a level of about 15–30% by weight of the impact modifier, component C. An effective amount of organosiloxane mixture or polybutene is that which improves the physical properties, particularly low temperature (that is, at 0° C. or less) impact strength, or surface appearance of molded parts compared to molded parts of the corresponding composition without organosiloxane mixture or polybutene. Improvements in surface appearance may be discerned by those skilled in the art and include diminution or elimination of gate blush, delamination, shark-skinning etc.

Compositions of the present invention can also include effective amounts of at least one additive selected from the group consisting of antioxidants, flame retardants, drip retardants, dyes, pigments, colorants, heat stabilizers, light stabilizers, nucleating agents, reinforcing agents, extending agents, glass fibers, carbon fibers and carbon fibrils, fillers such as small particle minerals including clay, mica, and talc, antistatic agents, plasticizers, lubricants, and mixtures thereof. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, thio compounds and amides derived from various fatty acids. The preferred amounts of these additives generally ranges up to about 2% total combined weight based on the total weight of the composition.

Compositions containing an organosiloxane mixture or at least one polybutene may be formulated using any convenient method. Typically the poly(diorganosiloxane) (sometimes containing one or more silicone additives and filler) is initially in the form of a high-viscosity gum or rubber which may not be suitable for uniform distribution amongst other blend components, for example in the feed hopper of an extruder. Also, a polybutene may be in the form of a liquid which may not be suitable for uniform distribution amongst other blend components, for example in the feed hopper of an extruder. Therefore, the poly (diorganosiloxane)-containing organosiloxane mixture or polybutene is preferably predispersed in a matrix comprising at least one of the resinous components (i.e. poly(phenylene ether), polyamide, or impact modifier) to produce a substantially free-flowing powder or crumb. Within the present context substantially free-flowing means that said powder or crumb does not phase separate or undergo particle agglomeration to the degree that it cannot be conveniently fed to suitable mixing equipment, for example using an extruder feed apparatus. Representative component ratios are about 40–99.9 wt. % matrix resin to about 60–0.1 wt. % of either organosiloxane mixture or polybutene. The matrix resin may be one or more poly(phenylene ether)s or one or more polyamides in the forms of high surface area powders. For example, two different molecular weight grades of matrix resin may be employed. Alternatively, the matrix resin may comprise a mixture of at least one poly(phenylene ether) and at least one polyamide high surface area powders. Poly (phenylene ether) is supplied from GE Plastics as a high-surface-area powder; polyamide supplied as extrudate pellets may be ground to a high-surface-area powder using a mechanical grinder fitted with (e.g.) a 1 mm. screen.

The amount of at least one resin used as the matrix for the free flowing powder containing the polybutene or organosiloxane mixture may constitute either all or only a portion of the total amount of that resin to be included in the blend. For example, if polyamide powder is used as a thermoplastic matrix to form a free flowing powder, then either all or only a portion of the polyamide may be added to the blend in the form of free flowing powder concentrate containing polybutene or organosiloxane mixture. Preferably, only a portion of the total polyamide is added in the form of a free flowing powder concentrate and the remaining polyamide is added separately in the form of pellets or powder.

Alternatively, the at least one polybutene or the poly (diorganosiloxane)-containing gum (sometimes containing one or more silicone additives) may be predispersed in a matrix comprising an inorganic filler such as those listed hereinabove. A preferred inorganic matrix is fumed silica. A more preferred inorganic matrix is a $D_4$-surface treated, high-surface-area fumed silica. A preferred composition comprises poly(diorganosiloxane)-containing gum/fumed silica powder in about 61.5 parts gum to about 38.5 parts fumed silica by weight. Depending upon such factors as the presence or absence of silicone additives, a poly (diorganosiloxane)-containing gum/inorganic matrix dispersion may be in the form of a free-flowing powder or a silicone rubber. For example, an organosiloxane mixture comprising 100 parts by weight (pbw) 0.25 mole % vinyl substituted poly(dimethylsiloxane) and 63 pbw $D_4$-treated fumed silica (about 200 square meters/gram surface area), 2.5 pbw methoxy-stopped silicone fluid (MeOD$_9$OMe), 2.5 pbw silanol-stopped silicone fluid (HOD$_7$OH), and 0.8 pbw vinyltriethoxysilane may be in the form of a rubber. Said rubbers may be converted to free flowing powders through predispersion in a matrix of at least one of the resinous components as described hereinabove.

The predispersion step may be carried out in suitable mixing equipment, e.g. a Henschel mixer. Processes for dispersion of poly(diorganosiloxane)-containing gum in appropriate, high-surface-area matrices are described, for example, in the aforementioned U.S. Pat. Nos. 3,824,208 and 5,153,238.

The poly(diorganosiloxane)-containing organosiloxane mixture in the form of a free flowing powder in either thermoplastic or inorganic matrix may be mixed with other blend components using an appropriate mixer. Alternatively, the high viscosity poly(diorganosiloxane)-containing gum itself (sometimes containing one or more silicone additives) or the at least one polybutene may be combined with all of the other blend components in a suitable mixer such as a Henschel mixer.

In another of its embodiments the present invention includes methods for making the impact modified, compatibilized poly(phenylene ether)-polyamide compositions containing either a polybutene or an organosiloxane mixture. The preparation of the compositions is normally achieved by merely blending the components under conditions for the formation of an intimate blend. Such conditions often include mixing in single or twin screw type extruders or similar mixing devices which can apply a shear to the components. Preferably, the blend components are subjected to extrusion processing for melt compounding into an intimately mixed blend. The uniform pellets produced by extrusion are suitable for shaping into useful, final forms by injection molding, thermoforming, etc.

All of the components may be added initially to the processing system, or else certain of the components may be precompounded, preferably the at least one poly(phenylene ether), the at least one impact modifier, the at least one polyamide, and/or the compatibilizing agent. In one embodiment the poly(phenylene ether) and the compatibilizing agent, component D, may be reacted in a separate processing step. It appears that certain properties, such as impact strength and elongation, are sometimes enhanced by initially precompounding the poly(phenylene ether) and the at least one impact modifier, optionally with any other components such as the compatibilizing agent, prior to compounding with the polyamide resin and other components. However, these improvements are sometimes done at the expense of increasing the viscosity of the compatibilized composition. While separate extruders may be used in the processing, these compositions are preferably prepared by using a single extruder having multiple feed ports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

In one embodiment of a suitable extrusion process the at least one polybutene or the organosiloxane mixture, preferably in the form of a free flowing powder, may be fed along with all other blend components to the initial feedport of an extruder. More preferably, the at least one polybutene or the organosiloxane mixture, preferably in the form of a free flowing powder, may be fed along with a portion of the other blend components to the initial feedport of an extruder while the remaining portion of the other blend components (excluding organosiloxane mixture and polybutene) is fed at a second feedport downstream of the initial feedport. Most preferably, a portion of at least one resinous component, preferably a portion of the polyamide (excluding organosiloxane mixture and polybutene), is fed at a downstream feedport while the remaining blend components are fed at the initial feedport.

In a particularly preferred embodiment, all or a portion of the at least one polybutene or the organosiloxane mixture, preferably in the form of a free flowing powder, may be fed in combination with either none or, preferably, a portion of the other blend components at a feedport downstream of the initial feedthroat. Most preferably, the at least one polybutene or the organosiloxane mixture, preferably in the form of a free flowing powder, is fed at a downstream feedport along with a portion of at least one resinous component, preferably the polyamide. The portion of polyamide fed at said downstream feedport may be in the form of either pellets, or powder, or both pellets and powder. All remaining blend components including the remainder of the polyamide (excluding organosiloxane mixture and polybutene) are fed to the initial feedport. When the at least one polybutene or the organosiloxane mixture is of a suitable viscosity to be handled by common pumping equipment at ambient temperature, then said materials may be fed to a downstream feedport as neat liquids, preferably along with a portion of the polyamide. Optionally, either or both of upstream and downstream feedports may be followed by an extruder barrel segment equipped with a vent, for example a vacuum vent or an atmospheric vent, for removal of any volatiles.

When a portion of the polyamide is added as free flowing powder concentrate with the at least one polybutene or the organosiloxane mixture, and the remaining portion of the polyamide is added separately, then it is not necessary that the polyamide in the free flowing powder concentrate be identical to the polyamide added separately. For example, two different molecular weight (or relative viscosity) grades of polyamide-66 may be used for the free flowing powder concentrate and for the remainder of the polyamide added separately. Other suitable combinations of polyamides include two different grades of polyamide-6, polyamide- 11, or polyarnide-12, or arylalkyl polyamides, or other polyamides known to those skilled in the art. It is also contemplated that one type of polyamide may be used to form free flowing powder with polybutene or organosiloxane mixture while a different polyamide may constitute the remaining polyamide in the composition. Similarly, when poly (phenylene ether) is used as the thermoplastic matrix for predispersion of organosiloxane mixture or polybutene, then two different IV grades of poly(phenylene ether) may be used, respectively, for the matrix and for the remainder of the poly(phenylene ether) added separately. Other suitable combinations of poly(phenylene ether)s include poly (phenylene ether) plus the copolymer of 2,6-dimethylphenol and 2,3,6-trimethylphenol.

It should be clear that methods to make the compositions and articles made from the compositions as disclosed are within the scope of the invention. Such articles include interior, exterior, and under-hood automotive parts such as fenders, panels, covers, housings, and the like.

The invention will be further illustrated by the following examples. In the examples the following materials have been used:

PPE: a poly(2,6-dimethyl-1,4-phenylene ether) with an intrinsic viscosity of 0.46 deciliters/gram as measured in chloroform at 25° C.;

PA-66-A: a polyamide-66 with amine end-group concentration of 55 microequivalents/gram and relative viscosity (RV) of 48 (grade FE3705 obtained from DuPont);

PA-66-B: a polyamide-66 with amine end-group concentration of 38 microequivalents/gram and RV of 32 (grade FE3704 obtained from DuPont);

PA-6: a polyamide-6 with amine end-group concentration of 88 microequivalents/gram and RV of 40 (grade G1013 obtained from Ube Industries, Japan);

CA: anhydrous citric acid;

Impact Modifier-A: hydrogenated styrene-butadiene-styrene ABA block copolymer (i.e. styrene-[ethylene-butylene]-styrene block copolymer, or SEBS) (SEPTON grade 8006 from Kuraray, Japan);

Impact Modifier-B: styrene-butadiene-styrene ABA block copolymer (SBS) (VECTOR grade V8508D from Dexco);

Polybutene: a polybutene with kinematic viscosity of about 116–128 centistokes at 38° C. (by ASTM D445) and number average molecular weight about 435 (by gel permeation chromatography) (INDOPOL grade L-65 obtained from Amoco);

Siloxane mixture: an 800 mm penetration poly (dimethylsiloxane) gum of general formula $M^{Vi}$-$D_xD^{Vi}_y$-$M^{Vi}$ containing about 0.25 mole % Vi groups on the chain ends and the backbone (grade 88488-8 from GE Silicones, Waterford, New York). The gum was converted into a free-flowing powder by mixing in a Henschel mixer with finely ground PA-66-B in a wt./wt. ratio of 10:90 gum to PA-66-B.

The compositions were subjected to extrusion processing on a 30 millimeter diameter twin-screw extruder operated at about 35 pounds per hour, 450 rpm, and 288° C. barrel set temperature. The extruder was equipped with an atmospheric vent following the initial feedport (i.e. the "upstream" or "US" feedport) and with a vacuum vent following the downstream feedport (i.e. the "downstream" or "DS" feedport). Dried blend extrudate pellets were molded into standard ASTM test specimens on an injection molding machine at 305° C. barrel set temperature, 88° C. mold temperature, 30 seconds cooling time and 15 seconds holding time.

EXAMPLES 1–5

Table 1 shows compositions of poly(phenylene ether), polyamide-66, impact modifier-A, citric acid compatibilizing agent, and poly(dimethylsiloxane)-containing organosiloxane mixture with amounts given in parts by weight. The ratio of poly(phenylene ether) to polyamide-66 to impact modifier to compatibilizing agent was the same in each composition. All of the poly(phenylene ether), impact modifier, and citric acid, and a portion of the total amount of polyamide-66 were fed to an extruder at the initial feedport (designated as the "upstream" or "US" feedport). A mixture of pure polyamide-66 pellets along with a free-flowing powder of polyamide-66/poly(dimethylsiloxane)-containing organosiloxane mixture concentrate was added at a second feedport downstream ("DS") of the initial feedport. The polyamide-66 fed upstream was PA-66-A in the form of pellets and its level was 25% of the total polyamide-66. The polyamide-66 fed downstream as pure polyamide-66 was also PA-66-A and its level ranged from 75 to 58% of the total polyamide-66. The polyamide-66 fed downstream in the form of the concentrate with organosiloxane mixture was PA-66-B, and its level ranged from 0 to 17% of the total polyamide-66. The total levels of organosiloxane mixture in these compositions were 0, 0.1, 0.5, and 1.0% by weight based on the weight of the total composition.

Two control blends were prepared. One control blend (control example 1) had no organosiloxane mixture and used PA-66-A as 100% of the total polyamide-66 (25% fed US and 75% fed DS). A second control blend (control example 5) had no organosiloxane mixture, 25% of the total polyamide-66 fed US as PA-66-A, and 75% of the total polyamide-66 fed DS as a mixture of PA-66-A (58% of total polyamide) and PA-66-B (17% of total polyamide). Table 2 shows the physical properties for the blends of Table 1.

TABLE 1

| Ex. | PPE US[a] | CA US | Impact Mod. -A US | PA-66 US, pellets | DS[b] | % PA DS as PA-66-A | Siloxane Mixture[c] DS | Blend Ratio US | DS |
|---|---|---|---|---|---|---|---|---|---|
| C1 | 37.44 | 0.66 | 6.55 | 13.24 | 39.71 | 100 | 0 | 57.89 | 39.71 |
| 2 | 37.44 | 0.66 | 6.55 | 13.24 | 39.71 | 97.73[d] | 0.1 | 57.89 | 39.81 |
| 3 | 37.44 | 0.66 | 6.55 | 13.24 | 39.71 | 88.66[d] | 0.5 | 57.89 | 40.21 |
| 4 | 37.44 | 0.66 | 6.55 | 13.24 | 39.71 | 77.33[d] | 1 | 57.89 | 40.71 |
| C5 | 37.44 | 0.66 | 6.55 | 13.24 | 39.71 | 77.33[e] | 0 | 57.89 | 39.71 |

[a]upstream
[b]downstream
[c]fed DS as powder concentrate with PA-66-B
[d]the remainder of the PA-66 was fed DS as PA-66-B powder concentrate with organosiloxane mixture
[e]the remainder of the PA-66 was fed DS as PA-66-B

TABLE 2

| Ex. | Notched Izod Impact (Joules/meter) | | Dynatup Impact Max. Load (kg.) | | Dynatup Impact Total Energy (Joules) | | Tens. Elong. at break (%) | Steady-State Capillary Shear Viscosity[a] (Pa-s.) |
|---|---|---|---|---|---|---|---|---|
| | 23° C. | −30° C. | 23° C. | −30° C. | 23° C. | −30° C. | | |
| C1 | 234.5 | 138.6 | 548 | 629 | 65.1 | 54.2 | 58 | 216 |
| 2 | 261.2 | 149.2 | 531 | 644 | 61.0 | 54.2 | 78 | 199 |
| 3 | 271.8 | 175.9 | 537 | 606 | 65.1 | 55.6 | 57 | 201 |

TABLE 2-continued

| Ex. | Notched Izod Impact (Joules/meter) | | Dynatup Impact Max. Load (kg.) | | Dynatup Impact Total Energy (Joules) | | Tens. Elong. at break (%) | Steady-State Capillary Shear Viscosity[a] (Pa-s.) |
|---|---|---|---|---|---|---|---|---|
| | 23° C. | −30° C. | 23° C. | −30° C. | 23° C. | −30° C. | | |
| 4 | 303.8 | 175.9 | 535 | 635[b] | 62.4 | 62.4[d] | 97 | 198 |
| C5 | 309.1 | — | 586 | 457[c] | 69.2 | 31.2[e] | 53 | 247 |

[a] at 288° C., 1000 s$^{-1}$
[b] standard deviation 40 kg.
[c] standard deviation 228 kg.
[d] standard deviation 5.4 Joules
[e] standard deviation 23.0 Joules All the samples showed either ductile failure or ductile punched-out failure at 23° C. in the Dynatup impact test.

These test data show that blends containing increasing levels (0.1 to 1.0 wt. %) of organosiloxane mixture in an impact modified poly(phenylene ether)-polyamide composition containing a mixture of different polyamide-66 grades at different ratios [examples 2,3, and 4 compared to control example 1] had improved room temperature notched Izod impact strength, improved tensile elongation at break at the highest level of organosiloxane mixture, improved low-temperature Dynatup energy, and improved flow at high shear rates.

These test data also show that blends containing organosiloxane mixture in an impact modified poly(phenylene ether)-polyamide composition containing a mixture of different polyamide-66 grades at the same ratio [example 4 compared to control example 5] had improved tensile elongation at break, improved low-temperature Dynatup energy, improved flow at high shear rates, and improved consistency of low-temperature Dynatup energy [reduced standard deviation of measurements].

The molded test parts showed subjectively good surface appearance. In particular the ASTM Dynatup plaques and tensile bars showed no evidence of gate blush or delamination. The parts had attractive gloss and showed no sign of typical impact modified poly(phenylene ether)-polyamide surface instabilities.

EXAMPLES 6–8

Table 3 shows compositions of poly(phenylene ether), polyamide-66-A, polyamide-6, impact modifier-B, anhydrous citric acid compatibilizing agent, and polybutene with amounts given in parts by weight. All of the poly(phenylene ether), impact modifier, citric acid, polybutene, and polyamide-66-A were fed to an extruder at the initial feed-port (designated as the "upstream" or "US" feedport). Polyamide-6 pellets were added at a second feedport downstream ("DS") of the initial feedport. The total levels of polybutene in these compositions were about 1.5 and 2.9% by weight based on the weight of the total composition. In addition the compositions of examples 6–8 contained aqueous potassium iodide and a hindered phenol thermal stabilizer (each fed US at the level of about 0.3 wt. % of the total composition) which were not considered in calculating the amounts given in Table 3.

One control blend was prepared (control example 6). It contained no polybutene. Table 4 shows the physical properties for the blends of Table 3.

TABLE 3

| Ex. | PPE US[a] | CA US | Impact Mod. -B US | PA PA-66-A US | PA-6 DS[b] | Poly-butene US | Blend Ratio US | DS |
|---|---|---|---|---|---|---|---|---|
| C6 | 49 | 0.6 | 10 | 10.35 | 31.05 | 0 | 69.95 | 31.05 |
| 7 | 49 | 0.6 | 10 | 10.35 | 31.05 | 1.5 | 71.45 | 31.05 |
| 8 | 49 | 0.6 | 10 | 10.35 | 31.05 | 3.0 | 72.95 | 31.05 |

[a] upstream
[b] downstream

TABLE 4

| Ex. | Notched Izod Impact (Joules/meter) | | Dynatup Impact Total Energy (Joules) | | Dynatup failure mode at −30° C. | Tens. Elong. at break (%) | Tens. Strength at break (MPa) |
|---|---|---|---|---|---|---|---|
| | 23° C. | −30° C. | 23° C. | −30° C. | | | |
| C6 | 665 | 230 | — | 54.3[a] | B[d] | 98 | 42.3 |
| 7 | 683 | 252 | — | 59.6[b] | 20% D[e] | 180 | 58.6 |
| 8 | 703 | 233 | — | 59.3[c] | 100% D[f] | 189 | 59.5 |

[a] standard deviation 11.0 Joules
[b] standard deviation 2.5 Joules
[c] standard deviation 4.2 Joules
[d] B brittle
[e] 20% of test samples failed in ductile mode
[f] 100% of test samples failed in ductile mode These test data show that addition of increasing levels of polybutene to an impact modified poly(phenylene ether)-polyamide composition containing a mixture of polyamide-66 and polyamide-6 grades resulted in improved room temperature notched Izod impact strength, improved tensile elongation at break, improved tensile strength at break, and improved low-temperature Dynatup impact total energy. In addition the failure mode for Dynatup test plaques gradually transitioned from brittle to ductile with increasing amount of polybutene.

The molded test parts showed subjectively good surface appearance. In particular the ASTM Dynatup plaques and tensile bars showed no evidence of gate blush or delamination. The parts have attractive gloss and show no sign of typical impact modified poly(phenylene ether)-polyamide surface instabilities.

EXAMPLES 9–10

Table 5 shows compositions of poly(phenylene ether), polyamide-66-A, impact modifier-B, anhydrous citric acid compatibilizing agent, and polybutene with amounts given in parts by weight. All of the poly(phenylene ether), impact modifier, citric acid, and polybutene, and a portion of polyamide-66-A were fed to the extruder at the initial feedport (designated as the "upstream" or "US" feedport). The remaining portion of polyamide-66-A pellets was added at a second feedport downstream ("DS") of the initial feedport. The total level of polybutene in these compositions was about 2.9% by weight based on the weight of the total composition. A control blend (control example 9) similar to example 10 was prepared without polybutene. The compositions of examples 9–10 contained aqueous potassium iodide and a hindered phenol thermal stabilizer (each fed US at the level of about 0.3 wt. % of the total composition) which were not considered in calculating the amounts given in Table 5. Table 6 shows the physical properties for the blends of Table 5.

TABLE 5

| Ex. | PPE US[a] | CA US | Impact Mod. -B US | PA-66-A | | Poly-butene US | Blend Ratio | |
|---|---|---|---|---|---|---|---|---|
| | | | | US | DS[b] | | US | DS |
| C9 | 49 | 0.6 | 10 | 10.35 | 31.05 | 0 | 69.95 | 31.05 |
| 10 | 49 | 0.6 | 10 | 10.35 | 31.05 | 3 | 72.95 | 31.05 |

[a]upstream
[b]downstream

TABLE 6

| | Notched Izod Impact (Joules/meter) | | Dynatup Impact Max. Load (kg.) | | Dynatup Impact Total Energy (Joules) | | Tens. Elong. at break (%) | Steady-State Capillary Shear Viscosity[a] (Pa-s.) |
|---|---|---|---|---|---|---|---|---|
| Ex. | 23° C. | −30° C. | 23° C. | −30° C. | 23° C. | −30° C. | | |
| C9 | 282 | 219 | 564 | 594 | 61.0 | 48.8 | 37 | — |
| 10 | 432 | 288 | 551 | 625 | 59.7 | 61.0 | 63 | 313 |

[a]at 288° C., 1000 s$^{-1}$

These test data show that addition of polybutene to an impact modified poly(phenylene ether)-polyamide composition containing polyamide-66 resulted in improved room temperature and low temperature Izod impact strength, improved low temperature Dynatup impact strength, and improved tensile elongation at break,.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A composition comprising the following and any reaction products thereof:
   (A) a continuous phase comprising at least one polyamide;
   (B) at least one poly(phenylene ether) resin;
   (C) at least one impact modifying polymer;
   (D) a non-polymeric functionalizing compound containing at least two functional groups capable of reacting with poly(phenylene ether)s and polyamides; and,
   a minor proportion, effective to improve physical properties or surface appearance of the composition, of
   (F) an organosiloxane mixture consisting essentially of a poly(dimethylsiloxane) gum containing about 0.25 mole % vinyl groups.

2. The composition of claim 1 in which the at least one polyamide is polyamide-66 or polyamide-6.

3. The composition of claim 1 in which the at least one polyamide is a mixture of polyamide-66 and polyamide-6.

4. The composition of claim 1 in which the poly (phenylene ether) is at least one of poly(2,6-dimethyl-1,4-phenylene ether) or poly(2,6-dimethyl-1,4-phenylene ether-co-2,3,6-trimethyl-1,4-phenylene ether).

5. The composition of claim 1 in which the impact modifying polymer is at least one member selected from the group consisting of styrene-butadiene copolymer, hydrogenated styrene-butadiene copolymer, styrene-butadiene-styrene copolymer, hydrogenated styrene-butadiene-styrene copolymer, styrene-isoprene copolymer, hydrogenated styrene-isoprene copolymer, styrene-isoprene-styrene copolymer, and hydrogenated styrene-isoprene-styrene copolymer.

6. The composition of claim 1 in which the non-polymeric functionalizing compound is at least one member selected from the group consisting of citric acid, maleic anhydride, and fumaric acid.

7. The composition of claim 1 in which the at least one polyamide is a mixture of polyamide-66 resins with different amine end-group concentrations.

8. A composition comprising the following and any reaction products thereof:
   (A) a continuous phase comprising at least one polyamide-66 resin;
   (B) a dispersed phase comprising about 20–60% by weight of the total composition of at least one poly (phenylene ether) resin;
   (C) about 1% to about 15% by weight of the total composition of at least one impact modifying polymer selected from the group consisting of styrene-butadiene copolymer, hydrogenated styrene-butadiene copolymer, styrene-butadiene-styrene copolymer, and hydrogenated styrene-butadiene-styrene copolymer;
   (D) about 0.1–2.0 parts citric acid per 100 parts of the combination of components A, B and C; and
   (F) about 1–15% by weight of the impact modifying polymer (C) of a poly(dimethylsiloxane) gum containing about 0.25 mole % vinyl groups.

9. An article made from the composition of claim 1.

10. The article of claim 9 which is an interior, exterior, or under-hood automotive part.

11. A method to prepare a composition comprising the following and any reaction products thereof:
   (A) a continuous phase comprising at least one polyamide;
   (B) at least one poly(phenylene ether) resin;
   (C) at least one impact modifying polymer;
   (D) a non-polymeric functionalizing compound containing at least two functional groups capable of reacting with poly(phenylene ether)s and polyamides; and, a minor proportion, effective to improve physical properties or surface appearance of the composition, of
(F) a poly(dimethylsiloxane) gum containing about 0.25 mole % vinyl groups,
which method comprises subjecting the mixture to extrusion processing wherein the poly (dimethylsiloxane) gum is fed to a feedport downstream of the initial feedport in combination with at least a portion of at least one of the resinous components.

12. The method of claim 11 wherein at least a portion of the resinous component fed downstream comprises at least one polyamide resin.

13. A method to prepare a composition comprising the following and any reaction products thereof:
(A) a continuous phase comprising at least one polyamide;
(B) at least one poly(phenylene ether) resin;
(C) at least one impact modifying polymer;
(D) a non-polymeric functionalizing compound containing at least two functional groups capable of reacting with poly(phenylene ether)s and polyamides; and,
a minor proportion, effective to improve physical properties or surface appearance of the composition, of
(F) a poly(dimethylsiloxane) gum containing about 0.25 mole % vinyl groups,
which method comprises subjecting the mixture to extrusion processing wherein the poly (dimethylsiloxane) gum is fed to the initial feedport in combination with other blend components and wherein at least a portion of at least one of the resinous components is fed to a feedport downstream of the initial feedport.

14. The method of claim 13 wherein at least a portion of the resinous component fed downstream comprises at least one polyamide resin.

15. A method to prepare a composition comprising the following and any reaction products thereof:
(A) a continuous phase comprising at least one polyamide-66 resin;
(B) a dispersed phase comprising about 20–60% by weight of the total composition of at least one poly (phenylene ether) resin;
(C) about 1% to about 15% by weight of the total composition of at least one impact modifying polymer selected from the group consisting of styrene-butadiene copolymer, hydrogenated styrene-butadiene copolymer, styrene-butadiene-styrene copolymer, and hydrogenated styrene-butadiene-styrene copolymer;
(D) about 0.1–2.0 parts citric acid per 100 parts of the combination of components A, B and C; and
(F) about 1–15% by weight of the impact modifying polymer (C) of a poly(dimethylsiloxane) gum containing about 0.25 mole % vinyl groups,
which method comprises subjecting the mixture to extrusion processing wherein the poly (dimethylsiloxane) gum is fed to a feedport downstream of the initial feedport in combination with a portion of the polyamide.

16. A method to increase the low temperature impact strength of a composition comprising,
(A) a continuous phase comprising at least one polyamide-66;
(B) a dispersed phase comprising about 20–60% by weight of the total composition of at least one poly (phenylene ether) resin;
(C) about 1% to about 15% by weight of the total composition of at least one impact modifying polymer selected from the group consisting of styrene-butadiene copolymer, hydrogenated styrene-butadiene copolymer, styrene-butadiene-styrene copolymer, and hydrogenated styrene-butadiene-styrene copolymer; and
(D) about 0.1–2.0 parts citric acid per 100 parts of the combination of components A, B and C;
wherein the method comprises adding to the composition about 1–15% by weight of the impact modifying polymer (C) of a poly(dimethylsiloxane) gum containing about 0.25 mole % vinyl groups.

* * * * *